United States Patent
Berstis et al.

(10) Patent No.: US 7,826,714 B2
(45) Date of Patent: Nov. 2, 2010

(54) CONTROLLING MOVIE SUBTITLES AND CAPTIONS

(75) Inventors: Viktors Berstis, Austin, TX (US); Randolph M. Forlenza, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1325 days.

(21) Appl. No.: 11/334,231

(22) Filed: Jan. 18, 2006

(65) Prior Publication Data

US 2007/0166005 A1    Jul. 19, 2007

(51) Int. Cl.
*H04N 7/00* (2006.01)

(52) U.S. Cl. .............................. 386/95; 386/45; 386/125

(58) Field of Classification Search ................. 386/95, 386/46; 36/125
See application file for complete search history.

(56) References Cited

U.S. PATENT DOCUMENTS

| 5,273,433 A | 12/1993 | Kaminski et al. |
|---|---|---|
| 5,486,872 A | 1/1996 | Moon |
| 5,572,260 A * | 11/1996 | Onishi et al. ................ 348/460 |
| 5,847,770 A | 12/1998 | Yagasaki |
| 6,400,399 B1 | 6/2002 | Anderson et al. |
| 2003/0021586 A1 | 1/2003 | Suh |
| 2005/0169606 A1 | 8/2005 | Yoo et al. |

* cited by examiner

*Primary Examiner*—Thai Tran
*Assistant Examiner*—Girumsew Wendmagegn
(74) *Attorney, Agent, or Firm*—William H. Steinberg; Robert C. Rolnik; Cardinal Law Group

(57) ABSTRACT

A method for controlling subtitles and captions information in video is described. The method includes determining at least one subtitle or caption within a video data stream, pausing the video data stream based on the determination and resuming play of the video data stream after a determined time period. The method may also include storing at least one subtitle or caption in a device memory based on the determination of at least one subtitle or caption within the video data stream, receiving a review subtitle or caption request at the device player and presenting at least one stored subtitle or caption for review. A system and computer readable medium including computer readable code for controlling subtitles and captions information in video is also described.

13 Claims, 3 Drawing Sheets

100

CONTROLLING MOVIE SUBTITLES AND CAPTIONS

FIELD OF INVENTION

The present invention generally relates to movie subtitles and captions. More specifically, the invention relates to controlling the display of movie subtitles and captions.

BACKGROUND OF THE INVENTION

Movie enthusiasts often encounter subtitles and captions when viewing movies on a home entertainment system. This is especially true when watching a movie or other broadcast that is in a language foreign to the viewer. Additionally, for many viewers it is difficult to read the subtitles and captions and watch the movie at the same time. Often, the viewer misses the action occurring on the screen when trying to read the subtitles and captions. Another problem encountered with subtitles and captions is that the subtitles and captions may not appear on screen long enough to be read by the viewer. These problems often lead to frustration with subtitled and captioned movies and, consequently, to lower sales or broadcasts of subtitled and captioned movies.

It is desirable, therefore, to develop a method of controlling and displaying movie and broadcast subtitles and captions that overcomes these and other disadvantages.

SUMMARY OF THE INVENTION

One aspect of the present invention provides a method for controlling subtitles and captions information in video. The method includes determining at least one subtitle or one caption within a video data stream, pausing the video data stream based on the determination and resuming play of the video data stream after a determined time period.

Another aspect of the invention provides a computer readable medium including computer readable code for controlling subtitle and caption information in video. The computer readable medium includes computer readable code for determining at least one subtitle or one caption within a video data stream, computer readable code for pausing the video data stream based on the determination and computer readable code for resuming play of the video data stream after a determined time period.

Another aspect of the invention provides a system for controlling subtitle and caption information in video. The system includes means for determining at least one subtitle or one caption within a video data stream, a means for pausing the video data stream based on the determination and a means for resuming play of the video data stream after a determined time period.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
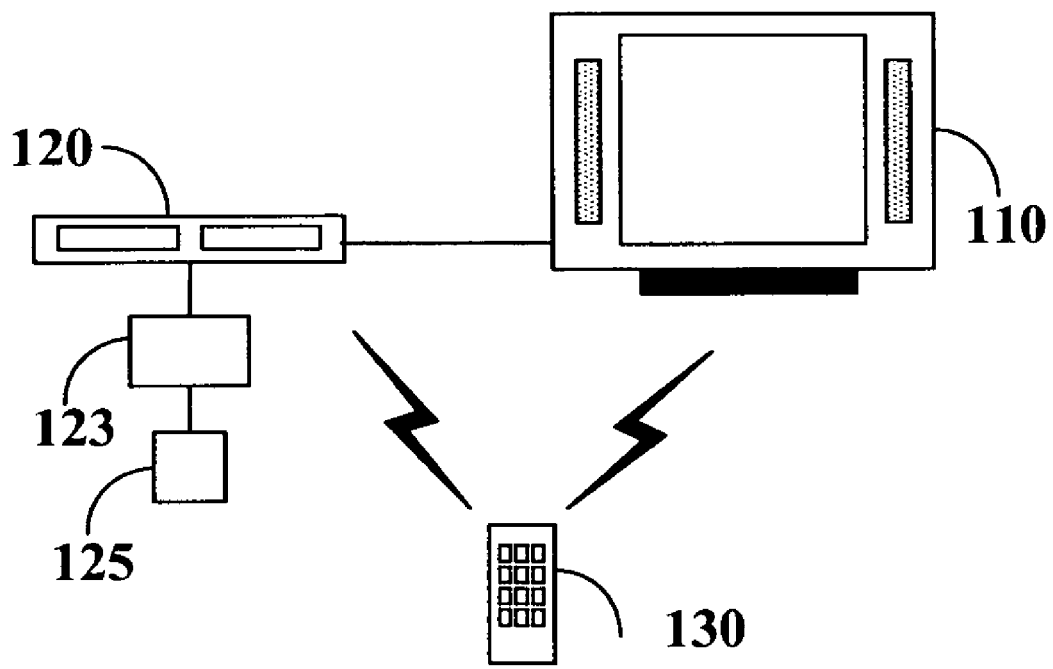
FIG. 1 illustrates one embodiment of a video player system for controlling subtitle and caption information, in accordance with one aspect of the invention.

FIG. 1 illustrates one embodiment of a video player system 100 for controlling subtitle and caption information, in accordance with one aspect of the invention. In one embodiment, system 100 includes a video display device 110 and a video player device 120 operably connected to video display device 110. System 100 may also include a remote control device 130 for controlling video display device 110 and/or video player device 120 as are well known in the art. Video display device 110 comprises a device for displaying a movie or television show. Video display device 110 may be, for example, a television, a computer monitor and the like, as are well known in the art.

Video player device 120 comprises a device having hardware and software capable of reading and/or receiving a video data stream and transmitting the video data stream to video display device 110 for viewing. Video display device 110 may be separate from, or integral to, video player device 120. Video player device 120 may be, for example, a DVD player, a video cassette player, or a combination DVD/video cassette player, as are well known in the art. In another embodiment, video player device 120 comprises a hard drive based video recorder, such as, for example, a TiVo® video recording device as are known in the art. In one embodiment, video player device 120 receives video data stream input via an antenna, a cable or satellite connection as are well known in the art. In another embodiment, the video data stream is received via an Internet connection. In another embodiment, video player device 120 reads or receives video data stream input from a DVD or video cassette tape as are well known in the art. In one embodiment, video player device includes a microprocessor 123 and a memory 125 for recording and storing video images as well as subtitles and captions. In one embodiment, microprocessor 123 includes computer readable code for controlling subtitle and caption information in a video.

Figure 2:
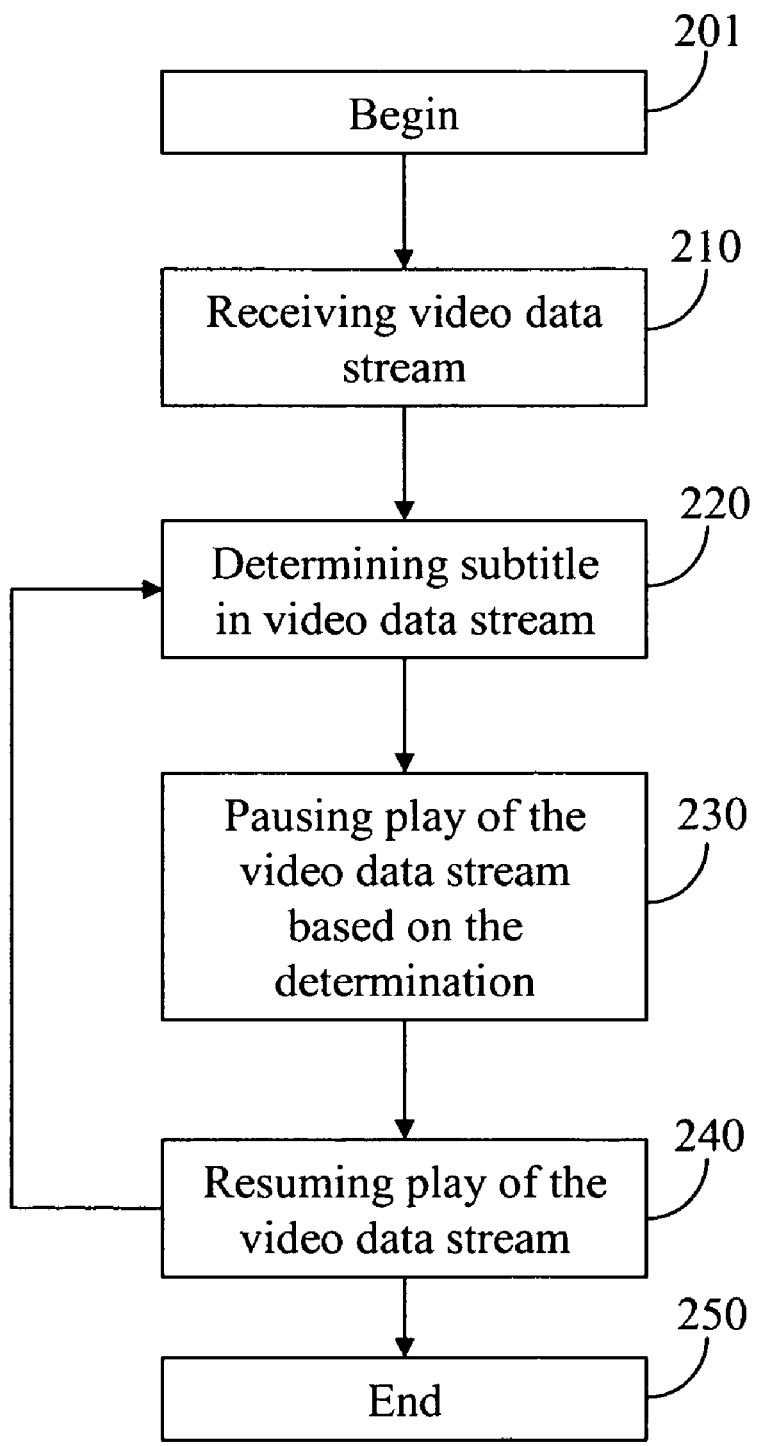
FIG. 2 illustrates one embodiment of a method for controlling subtitle and caption information in a video, in accordance with one aspect of the invention.

FIG. 2 illustrates one embodiment of a method 200 for controlling subtitle and caption information in a video, in accordance with one aspect of the invention. Those with skill in the art will recognize that the steps of method 200 do not necessarily have to be performed in the exact order as described, herein. Method 200 begins at 201.

At step 210, a video data stream is received at video player device 120 and displayed on video display device 110 in a manner viewable by a user. In one embodiment, the video data stream comprises audio data, video data and subtitle and/or caption data as is well known in the art. The subtitle and caption data may be in, for example, MPEG format, text format, XML or HTML format, as are well known in the art.

At step 220, as the video data stream is being displayed on the video display device 110, a determination is made at the video player device 120 as to whether the video data stream includes subtitle and/or caption data. In one embodiment, the video data stream includes subtitle and/or caption text as a first line of the video stream. In another embodiment, the subtitle and caption text comprises a subtitle and caption data stream that is separate from the video and/or audio portion of the video data stream. In one embodiment, video player device 120 includes a subtitle and caption decoder that determines the presence of subtitle and caption data. Based on the determination that subtitle and caption data is present in the video data stream, video player device 120 pauses the play of the video data stream, at step 230.

At step 230, play of the video data stream is paused for a determined length of time. In one embodiment, the length of time is determined based on the length of the subtitle or caption that is currently displayed on video display device 110. For example, a subtitle or caption containing two words would be displayed for a shorter length of time than a subtitle or caption containing ten words. In another embodiment, play of the video data stream may be for a predetermined length of time set by the user. In an example, the pause may be configured to last ten seconds. In another example the pause is set to last from five to twenty seconds. Those with skill in the art will recognize that the length of the pause may be set for any length of time especially if the length of time is predetermined by the user. In another embodiment, the determined time period may be shortened or lengthened by user input. In one embodiment, a user may press a button on remote control 130 to continue pausing the video or resume play of the video. In another embodiment, the length of time for pausing the play of the video is determined on the degree of color contrast between the displayed subtitle and caption text and the video portion surrounding the displayed subtitle and caption text. In one embodiment, video player device 120 pauses the playing of the video for an increased length of time based on a determination that the color contrast between the subtitle and caption text and the surrounding video display is low.

At step 240, play of the video data stream is resumed. In one embodiment, play of the video data stream is resumed after the expiration of the determined length of time for pausing the video data stream. In another embodiment, the user may resume play of the video data stream by pressing a button on the remote.

After the resumption of play at step 240, method 200 repeats steps 220 to 240 until the video is completed, viewing ends or one of the video display device 110 or video player device 120 is turned off. Method 200 ends at step 250.

Figure 3:
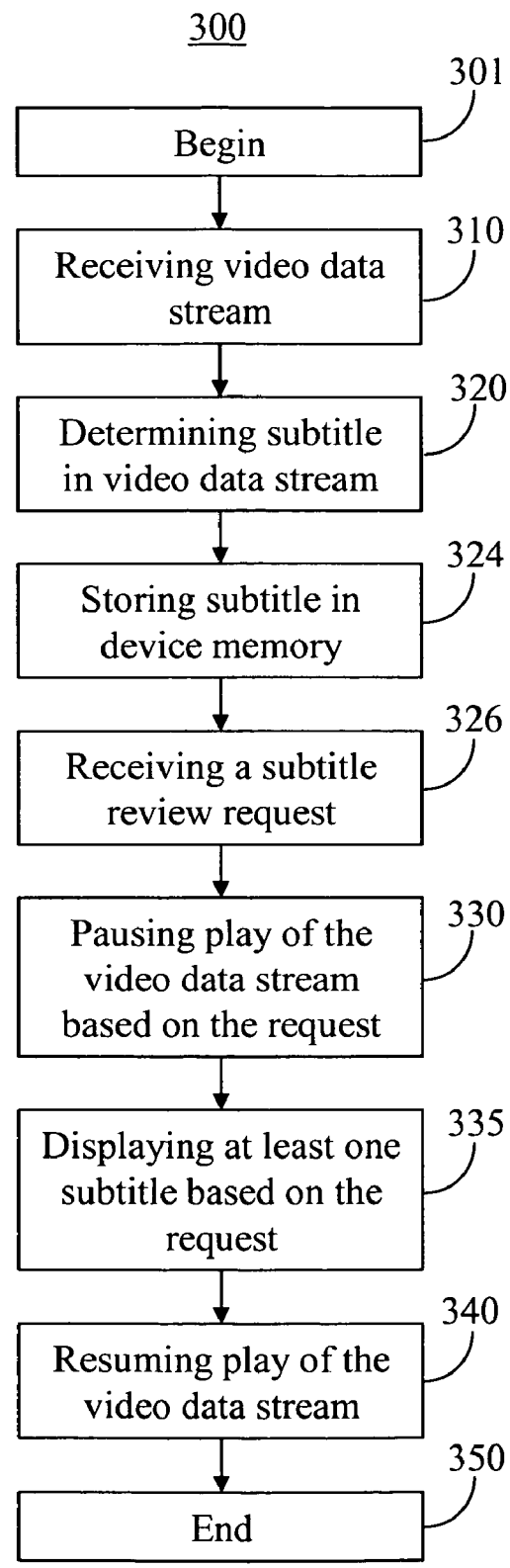
FIG. 3 illustrates another embodiment of a method for controlling subtitle and caption information in a video, in accordance with one aspect of the invention.

FIG. 3 illustrates another embodiment of a method 300 for controlling subtitle and caption information in a video, in accordance with one aspect of the invention. Method 300 begins at 301.

At step 310, a video data stream is received at video player device 120 and displayed on video display device 110 in a manner viewable by a user. In one embodiment, step 310 is implemented as in step 210. At step 320, as the video data stream is being displayed on the video display device 110, a determination is made at the video player device 120 as to whether the video data stream includes subtitles or captions data. In one embodiment, step 320 is implemented as in step 220.

Based on the determination that subtitle or caption data is present in the video data stream, video player device 120 stores the subtitle and caption data, at step 324. In one embodiment, microprocessor 123 stores the subtitle and caption data in memory 125.

At step 326, a subtitle and caption review request is received at video player device 120. In one embodiment, a user makes the request by pressing a button on the remote 130. In another embodiment, the user scrolls through a menu displayed on the video display and selects a request via the remote 130.

Based on the request, play of the video data stream is paused. In one embodiment, step 330 is implemented as in step 230.

At step 335, at least one subtitle or one caption is presented to the user for review based on the subtitle and caption review request received at step 326. In one embodiment, a reviewing window is opened on the display of video display device 110. In this embodiment, a plurality of previously viewed subtitles and captions may be shown. In an example, the display may show the last ten subtitles and/or captions. In another embodiment, the user may scroll through any number of previously viewed subtitles and captions. In another embodiment, subtitles and captions may be presented to the user one at a time starting with the most recent. In this embodiment, the user may use the remote to scroll backwards through the previously viewed subtitles and captions to reach the desired subtitle or caption. In another embodiment, the user can scroll forward from a previously viewed subtitle or caption to reach the current subtitle or caption.

At step 340, play of the video data stream is resumed. In one embodiment, play of the video data stream is resumed after the expiration of a determined length of time for pausing the video data stream. In another embodiment, the user may resume play of the video data stream by pressing a button on the remote once the user is finished reading the displayed subtitles and captions. In one embodiment, the play of the video is resumed from the point of the video where the video was paused. In another embodiment, the play of the video is resumed from the point of the last viewed subtitle or caption. In another embodiment, the user may scroll through a list of previously viewed subtitles and captions and make a selection via the remote to start playing the video from that point.

Method 300 ends at step 340.

Those with skill in the art will recognize that the steps of method 300 do not necessarily have to be performed in the exact order as described. For example, in one embodiment, steps 330 and 326 may be reversed. In this embodiment, the user may send a subtitle and caption review request while the video data stream is paused based on the determination that subtitles or captions are present within the video data stream. In one embodiment, receiving the subtitle and caption review request and pausing play of the video data stream occurs simultaneously.

In another embodiment of a method for controlling subtitle and caption information in a video, the determination of whether a video data stream includes subtitle and caption data comprises using character recognition software to scan the video tape or DVD as it is being played. In this embodiment, the microprocessor scans the video, recognizes text characters and extracts them from the video data stream. Once extracted, the text is saved as subtitle and caption data. This subtitle and caption data may then be reviewed in response to a subtitle and caption review request.

In another embodiment of the invention, the video portion may be paused to view the current subtitle or caption for a determined length of time or in response to a subtitle and caption review request as described above in methods 200 and 300. Additionally, as the video is paused, an audio file containing music may continue to be played during the pause. Then, upon resumption of play of the video portion, the audio portion may seamlessly return to the point of resumption of play. In one embodiment, a predetermined music selection is played. In one embodiment, the predetermine music selection comprises a short audio file that repeats until the play of the video is resumed. In another embodiment, the predetermined audio comprises a short loop of audio that is part of the audio file located at the point in the video where the video was paused. In one embodiment, the audio data stream is divided into a plurality of short segments. In another embodiment, when the video data stream is paused, the short segment of audio continues to play and will repeat until play is resumed.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of controlling subtitle and caption information in video, the method comprising:
    determining at least one subtitle or at least one caption within a video data stream;
    pausing the video data stream based on the determination; and
    resuming play of the video data stream after a determined time period, wherein the determined time period comprises a period determined by a video player device based on the length of the determined subtitle or caption.

2. The method of claim 1 wherein the determined time period comprises a predetermined time period.

3. The method of claim 1 wherein the determined time period is determined based on a user defined input.

4. The method of claim 1 further comprising: storing at least one subtitle or caption in a device memory based on the determination of at least one subtitle or at least one caption within the video data stream.

5. The method of claim 4 further comprising:
    receiving a review subtitle and caption request at the video player device; and
    presenting by video player device at least one stored subtitle or caption for review.

6. A computer readable non-transitory medium including computer readable code for controlling subtitle and caption information in video, the medium comprising:
    computer readable code for determining at least one subtitle or at least one caption within a video data stream;
    computer readable code for pausing the video data stream based on the determination; and
    computer readable code for resuming play of the video data stream after a determined time period, wherein the computer readable code for resuming play of the video data stream comprises instructions for determining the time period based on a length of the determined subtitle or at least one caption.

7. The computer readable non-transitory medium of claim 6 wherein the determined time period comprises a predetermined time period.

8. The computer readable non-transitory medium of claim 6 wherein the determined time period is determined based on a user defined input.

9. The computer readable non-transitory medium of claim 6 further comprising:
    computer readable code for storing at least one subtitle or at least one caption in a device memory based on the determination of at least one subtitle or at least one caption within the video data stream.

10. The computer readable non-transitory medium of claim 9 further comprising:
    computer readable code for receiving a review subtitle and caption request at the video player device; and
    computer readable code for presenting at least one stored subtitle or at least one caption for review.

11. A system for controlling subtitle and caption information in video, the system comprising:
    means for determining at least one subtitle or at least one caption within a video data stream;
    means for pausing the video data stream based on the determination; and
    means for resuming play of the video data stream after a determined time period, wherein the determined time period comprises a period determined by a video player device based on the length of the determined subtitle or caption.

12. The system of claim 11 further comprising:
    means for storing at least one subtitle or at least one caption in a device memory based on the determination of at least one subtitle or at least one caption within the video data stream.

13. The system of claim 12 further comprising:
    means for receiving a review subtitle and caption request at the device player; and
    means for presenting at least one stored subtitle or at least one caption for review.

* * * * *